(12) United States Patent
Jung et al.

(10) Patent No.: US 10,930,280 B2
(45) Date of Patent: Feb. 23, 2021

(54) DEVICE FOR PROVIDING TOOLKIT FOR AGENT DEVELOPER

(71) Applicant: LG ELECTRONICS INC., Seoul (KR)

(72) Inventors: Seulki Jung, Seoul (KR); Bongjun Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 86 days.

(21) Appl. No.: 16/197,171

(22) Filed: Nov. 20, 2018

(65) Prior Publication Data

US 2019/0156827 A1 May 23, 2019

Related U.S. Application Data

(60) Provisional application No. 62/588,441, filed on Nov. 20, 2017, provisional application No. 62/588,442, (Continued)

(30) Foreign Application Priority Data

Nov. 14, 2018 (KR) .......................... 10-2018-0140148

(51) Int. Cl.
*G10L 15/22* (2006.01)
*G06F 8/33* (2018.01)
(Continued)

(52) U.S. Cl.
CPC .............. *G10L 15/22* (2013.01); *G06F 3/167* (2013.01); *G06F 8/33* (2013.01); *G06F 40/295* (2020.01);
(Continued)

(58) Field of Classification Search
CPC ...................................................... G10L 15/22
(Continued)

(56) References Cited

U.S. PATENT DOCUMENTS

| 2008/0221903 A1 | 9/2008 | Kanevsky et al. |
| 2010/0057463 A1* | 3/2010 | Weng .................. G06F 40/20 704/257 |

(Continued)

FOREIGN PATENT DOCUMENTS

| JP | 2010224194 | 10/2010 | |
| JP | 2016192121 A * | 11/2016 | ............. G10L 15/22 |

(Continued)

OTHER PUBLICATIONS

Korean Intellectual Property Office Application No. 10-2018-0140148, Office Action dated Feb. 21, 2020, 36 pages.

(Continued)

*Primary Examiner* — Bharatkumar S Shah

(57) ABSTRACT

Disclosed is a system for providing a toolkit for an agent developer. A system for providing a toolkit for an agent developer according to an embodiment of the present invention includes: an interface unit that obtains an utterance input by a user and outputs the utterance; and a support unit that determines intent of the utterance input by the user when the utterance is received through the interface unit, and provides another utterance or response corresponding to the determined intent through the interface unit.

11 Claims, 6 Drawing Sheets

Related U.S. Application Data filed on Nov. 20, 2017, provisional application No. 62/588,443, filed on Nov. 20, 2017.

(51) Int. Cl.
| | | |
|---|---|---|
| *G10L 25/72* | (2013.01) | |
| *G06F 3/16* | (2006.01) | |
| *G06F 40/35* | (2020.01) | |
| *G06F 40/295* | (2020.01) | |

(52) U.S. Cl.
CPC .............. *G06F 40/35* (2020.01); *G10L 25/72* (2013.01); *G10L 2015/223* (2013.01); *G10L 2015/225* (2013.01)

(58) Field of Classification Search
USPC ........................................................ 704/239
See application file for complete search history.

(56) References Cited

U.S. PATENT DOCUMENTS

| | | |
|---|---|---|
| 2010/0241418 A1 | 9/2010 | Maeda et al. |
| 2013/0325468 A1 | 12/2013 | Lee et al. |
| 2013/0339021 A1 | 12/2013 | Deshmukh et al. |
| 2015/0012464 A1 | 1/2015 | Gilbert |
| 2016/0063995 A1* | 3/2016 | Choi ..................... G06F 3/0482 704/245 |
| 2017/0213545 A1* | 7/2017 | Kwon ..................... G06F 40/35 |
| 2019/0180740 A1* | 6/2019 | Nandy ..................... G10L 15/22 |

FOREIGN PATENT DOCUMENTS

| | | | |
|---|---|---|---|
| KR | 1020100111164 | 10/2010 | |
| KR | 20140112364 A * | 9/2014 | ............. G10L 15/22 |
| KR | 1020160019942 | 2/2016 | |
| KR | 1020160025301 | 3/2016 | |

OTHER PUBLICATIONS

PCT International Application No. PCT/KR2018/014237, Written Opinion of the International Searching Authority dated Feb. 25, 2019, 8 pages.

Korean Intellectual Property Office Application No. 10-2018-0140148, Notice of Allowance dated Oct. 28, 2020, 6 pages.

\* cited by examiner

DEVICE FOR PROVIDING TOOLKIT FOR AGENT DEVELOPER

CROSS REFERENCE TO RELATED APPLICATIONS

Pursuant to 35 U.S.C. § 119, this application claims the benefit of earlier filing date and right of priority to Korean Patent Application No. 10-2018-0140148, filed on Nov. 14, 2018, and also claims the benefit of U.S. Provisional Application No. 62/588,441, filed on Nov. 20, 2017, 62/588,442, filed on Nov. 20, 2017, and 62/588,443, filed on Nov. 20, 2017, the contents of which are all hereby incorporated by reference herein in their entirety.

BACKGROUND OF THE INVENTION

Field of the Invention

The present invention relates to a device for providing a toolkit for an agent developer, the device being able to provide a toolkit that is convenient for an agent developer to register utterances.

Description of the Related Art

Artificial intelligence, which is a field of computer engineering and information technology that study a method of enabling a computer to perform thinking, learning, and self-development that can be achieved by human intelligence, means a technology that enables a computer to follow intelligent behaviors of human.

Artificial intelligent does not exist by itself, but directly and indirectly relates to other fields of computer science. In particular, it is recently actively attempted to introduce artificial intelligent factors into various fields of an information technology and use the factors to solve problems in the fields.

Meanwhile, a context awareness technology that recognizes the situation of a user using artificial intelligence and provides information that the user wants in a desired format has been actively studied in the related art.

Demands for systems that can perform functions suitable for situations of users have been increased with development of the context awareness technology.

Agents that have conversations with users through voices and provide various services to users by recognizing voices have been developed by combining a technology of recognizing users' voices and the context awareness technology.

In order to develop such agents, agent developers have to register various utterances to correspond to the users' intents. However, it is very massive and difficult work to think of and register various utterances that users are likely to give, so experts at Natural Language Processing (NLP) have usually performed this work.

There is a need for providing a toolkit that recommends utterances corresponding to situations so that agent developers can easily develop agents.

SUMMARY OF THE INVENTION

In order to solve these problems, an object of the present invention is to provide a system for providing a toolkit for an agent developer, the system being able to provide a toolkit that is convenient for an agent developer to register utterances.

A system for providing a toolkit for an agent developer according to an embodiment of the present invention includes: an interface unit that obtains an utterance input by a user and outputs the utterance; and a support unit that determines intent of the utterance input by the user when the utterance is received through the interface unit, and provides another utterance or response corresponding to the determined intent through the interface unit.

DETAILED DESCRIPTION OF THE INVENTION

Figure 1:
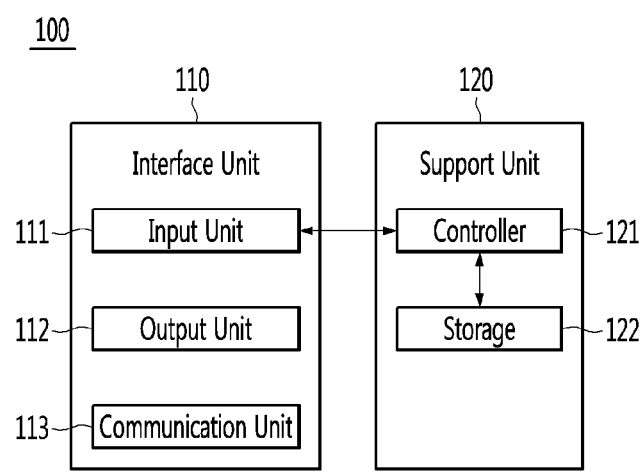
FIG. 1 is a block diagram illustrating a system for providing a toolkit for an agent developer according to an embodiment of the present invention.

Hereafter, embodiments of the present invention will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present invention makes the subject matter of the embodiments described herein unclear, the detailed description is omitted. The accompanying drawings are provided only for helping easily understand the embodiments described herein without limiting the technological spirit of the present invention and should be construed as including all modifications, equivalents, and replacements that are included in the spirit and scope of the present invention.

Terms including ordinal numbers such as 'first', 'second', etc., may be used to describe various components, but the components are not to be construed as being limited to the terms. The terms are used to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

FIG. 1 is a block diagram illustrating a device for providing a toolkit for an agent developer according to an embodiment of the present invention.

A device 100 for providing a toolkit for an agent developer may be referred to as a toolkit providing device 100 in the following description.

A device 100 for providing a toolkit for an agent developer may be referred to as a system 100 for providing a toolkit for an agent developer in the following description.

The system 100 for providing a toolkit for an agent developer is a system that provides a toolkit to an agent developer so that the agent developer can conveniently register utterances or responses corresponding to user's intents.

The toolkit may be a software tool set. Accordingly, while an agent developer registers utterances or responses, the system 100 for providing a toolkit for an agent developer can recommend at least one of an utterance and a response to the agent developer.

The system for providing a toolkit for an agent developer may operate as a server that provides a toolkit to another system.

The system 100 for providing a toolkit for an agent developer may include an interface unit 110 and a support unit 120.

The interface unit 110, which is a component for interfacing with a user, may include at least one of an input unit 111, an output unit 112, and a communication unit 113.

The input unit, which is an input device that receives data input by a user, may include a camera or an image input unit for inputting image signals, a microphone or an audio input unit for inputting audio signals, and a user input unit (e.g., a touch key and a mechanical key) for receiving information from a user.

Accordingly, a user can input utterances or responses through the input unit 111 and the input unit 111 can obtain the utterances or responses input by the user.

The output unit 112, which is an output device that outputs and provides data to a user, may include at least one of a display unit and a sound output unit. Accordingly, the system 100 for providing a toolkit for an agent developer can display or output, using sounds, utterances or responses that are recommended by the system 100 for providing a toolkit for an agent developer.

The communication unit 113 can be used when another device that is used by an agent developer connects with the toolkit providing system 100 and receives a toolkit.

The communication unit 113 can provide connection with another device by communicating with the device.

An agent developer can input utterances or responses to another device and the device can transmit utterances or responses input by a user to the toolkit providing system 100. Accordingly, the communication unit 113 can obtain utterances or responses input by a user.

The toolkit providing system 100 can transmit utterances or responses recommended by the toolkit providing system 100 to another device through the communication unit 113.

In this case, the device can display or output, using sounds, the utterances or responses recommended by the toolkit providing system 100.

In this way, an agent developer can connect with the toolkit providing system 100 using his/her device such as a computer and can be provided with a toolkit service that is provided by the toolkit providing system 100.

The support unit 120 may include a controller 121 and a storage 122.

The storage 122 keeps data that support various functions of the toolkit providing system 100. The storage 122 can keep various application programs (or applications) that are executed by the toolkit providing system 100, data for operation of the toolkit providing system 100, and data (e.g., at least one item of algorithm information for machine learning) for operation of the controller 121. At least some of the application programs can be downloaded from an external server through wireless communication.

The controller 121 can control general operation of the toolkit providing system 100 and may be referred to as a microprocessor, a processor, and a control unit.

The controller 121 can provide functions or operations based on an artificial intelligence technology.

The controller 121, which processes information on the basis of an artificial intelligence technology, may include one or more modules that perform at least one of learning information, inferring information, recognizing information, and processing natural languages.

The controller 121 can perform at least one of learning, inferring, and processing a huge amount of information (big data) such as information kept in a voice recognizing device, environment information around a voice recognizing device, and information kept in an external storage that can perform communication, using a machine learning technology. An artificial intelligence unit 130 can estimate (or infer) at least one executable operation of a voice recognizing device and control the voice recognizing device such that the most executable operation of the estimated operations is performed, using information learned using the machine learning technology.

The machine learning technology is a technology that collects and learns a large amount of information and determines and estimates information on the basis of the learned information, on the basis of at least one algorithm. Learning information is an operation that quantifies relationships between information and information by finding out characteristics, rules, and criterions of the information and estimates new data using the quantified pattern.

An algorithm that uses the machine learning technology may be an algorithm based on statistics, and for example, may be a decision tree that uses a tree structure as an estimation model, a neural network that follows the neural network structures and functions of organisms, genetic programming that is based on the evolution algorithms of organisms, clustering that distributes observed examples to partial sets called clusters, and a Monter carlo method that statistically calculates values of function from random numbers that are randomly extracted.

As a filed of the machine learning technology, a deep learning technology is a technology that performs at least one of learning, determining, and processing information, using an artificial neural network algorithm. The artificial neural network can have a structure that connects layers to each other and transmit data between the layers. The deep learning technology can learn a huge amount of information through an artificial neural network, using a graphic processing unit (GPU) optimized for parallel calculation.

The controller 121 can collect (sense, monitor, extract, detect, and receive) signals, data, and information etc. that are input to or output from components of a voice recognizing device to collect a huge amount of information for applying the machine learning technology. The controller 121 can collect (sense, monitor, extract, detect, and receive) data, and information etc. kept in an external storage (e.g., a cloud server) connected through communication. In detail, collection of information may be understood as a term including an operation that senses information through a sensor, extracts information kept in a storage, and receives information from an external storage through communication.

When a specific operation is performed, the controller 121 can analyze historical information showing performance of the specific operation and update previously learned information on the basis of the analysis information. Accordingly, the controller 121 can improve accuracy in information estimation.

Figure 2:
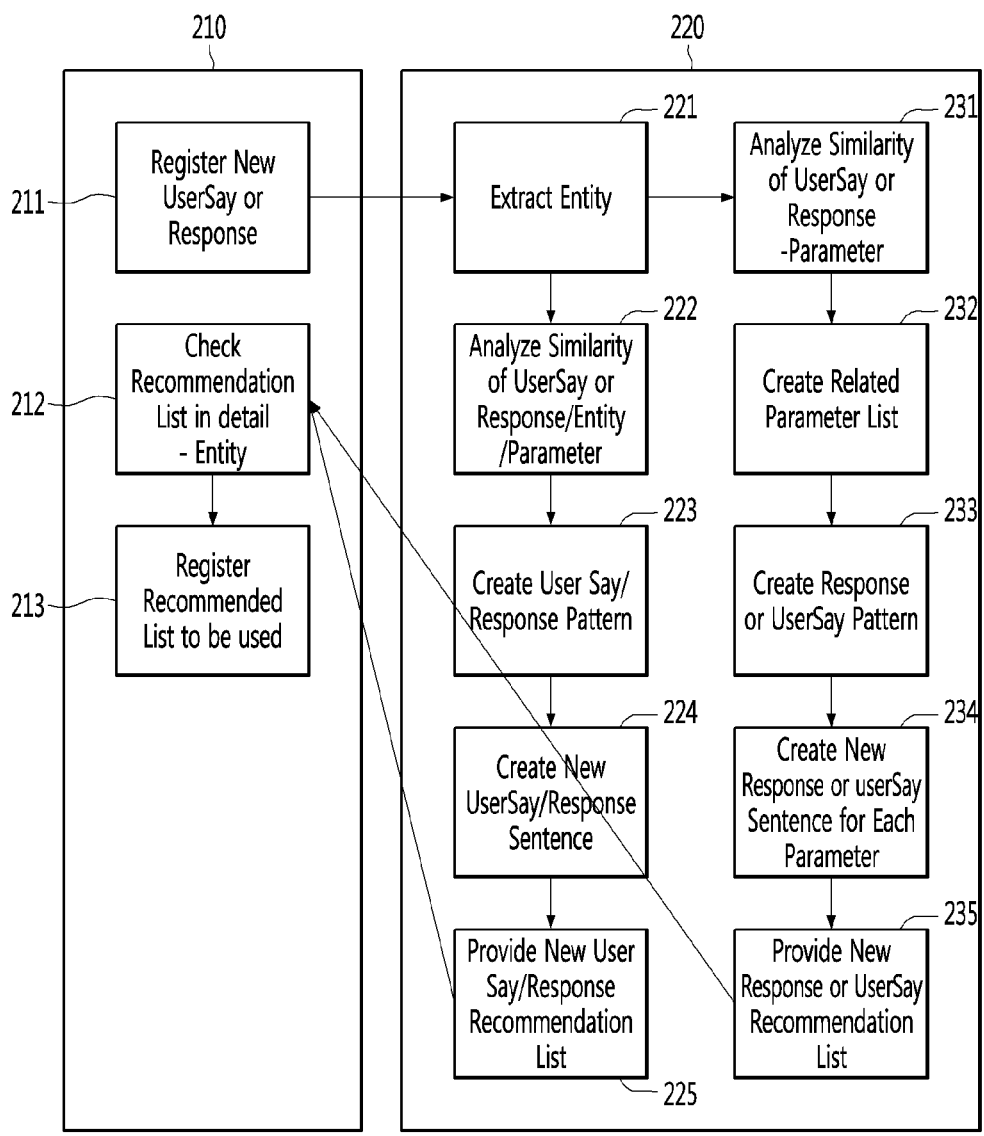
FIG. 2 is a diagram illustrating a method of recommending an utterance according to an embodiment of the present invention.

FIG. 2 is a diagram illustrating a method of recommending an utterance according to an embodiment of the present invention.

Operation of a user and operation of the toolkit providing system 100 are described with reference to a first block 210 and a second block 220, respectively.

A user can input an utterance or a response (211).

The utterance may mean a sentence that a human gives to be provided with a service from a system. For example, the utterance may be "play music".

A voice recognizing agent can find out the intent of a human and provide a service corresponding to the intent of a human by analyzing an utterance. For example, an utterance "play music" is received, the voice recognizing agent can find out that the intent of a human is "playback of music" and provide a service for playing music.

A developer of the voice recognizing agent can develop the voice recognizing agent in a way of matching and registering various utterances, which is likely to be given, with intents of humans so that humans are provided with services. For example, a developer of the voice recognizing agent can develop the voice recognizing agent by matching and registering an utterance "play music" with "playback of music" and repeating this process.

"Utterance that is input by a user" used herein may mean an utterance that is input by a developer of a voice recognizing agent to develop the voice recognizing agent.

"UserSay" shown in figures may mean an utterance.

A response may mean a sentence that is given after a voice recognizing agent provides a service corresponding to a human's intent. For example, an utterance "play music" is received, the voice recognizing agent can find out that the intent of a human is "playback of music", provide a service for playing music, and gives a response "music is played".

The developer of the voice recognizing agent can develop the voice recognizing agent in a way of matching and registering various responses, which are likely to be given, with services after services are provided. For example, a developer of a voice recognizing agent can develop a voice recognizing agent by matching a service "playback of music" with a response "music is played" and repeating this process.

"Response that is input by a user" used herein may mean a response that is input by a developer of a voice recognizing agent to develop the voice recognizing agent.

"Response" shown in figures may mean a response.

It is exemplified in the following description that a user gives an utterance and the toolkit providing system 100 recommends an utterance or a response. However, the present invention is not limited thereto and the toolkit providing system 100 may recommend an utterance or a response even if a user inputs a response.

When a user input an utterance (211), the support unit 120 of the toolkit providing system 100 can receive the utterance input by the user through the interface unit 110.

In this case, the support unit 120 can extract at least one of an entity name, an entity name word, a parameter, or a common word from the input utterance (221).

In detail, the utterance may include at least one of an entity name, an entity name word, a parameter, and a common word.

The entity name may be a name indicating a group of entity name words that are synonyms or not in dictionary meanings, but can be construed as having the same meanings when user's intents are analyzed.

For example, "play", "start", "playback", "replay", and "turn on" may be all construed and processed as the meaning of "play". In this case, "play", "start", "playback", "replay", and "turn on" may be entity name words, and "play" may be an entity name.

For example, "play", "start", "playback", "download", "pass", and "stop" may be all construed and processed as the meaning of "control". In this case, play", "start", "playback", "download", "pass", and "stop" may be all entity name words, and "control" may be an entity name.

Parameters are matched with entity names to classify and use each entity name in several meanings and can provide a method of construing entity names.

For example, the entity name of an entity name word "fifteenth day" may be "date". When a parameter that is matched with "fifteenth day" is "start date", the "fifteenth day" may be construed as that "start date is fifteenth day". On the other hand, when a parameter that is matched with "fifteenth day" is "end date", the "fifteenth day" may be construed as that "end date is fifteenth day".

The support unit 120 can extract at least one of an entity name, an entity name word, a parameter, or a common word from an input utterance.

For example, when an utterance "play a song, please" is input, the support unit 120 can obtain an entity name word "song", an entity name "music_song", an entity name word "start", an entity name "play", and a common word "please". This can be expressed as followings.

[<start: @play> <song: @music_song> please]

For example, when an utterance "staying from 15 to 20" is input, the support unit 120 can obtain an entity name word "15", an entity name "date", a parameter "start_date", an entity name word "20", an entity name "date", and a parameter "end_date".

This can be expressed as followings.

[staying from <15: @date, $start_date> to <20: @date, $end_date>]

The support unit can determine the intent of a received utterance.

In detail, the support unit can obtain similarities between a received utterance and utterances pertaining to various intents and determine the intents of the received utterances on the basis of the similarities (222).

The support unit can obtain similarities between the received utterances and other utterances.

In detail, the support unit can obtain the similarity between a received utterance and another utterance using at least one of an entity name, an entity name word, a parameter, and a common word of the received utterance and at least one of an entity name, an entity name word, a parameter, and a common word of another utterance.

In detail, the support unit can obtain the pattern of a received utterance using at least one of an entity name, an entity name word, a parameter, and a common word of the received utterance. A support vector machine (SVM), deep learning, and word embedding etc. may be used to analyze the pattern of a received utterance.

The pattern of another utterance may have been obtained in advance using at least one of an entity name, an entity name word, a parameter, and a common word of the utterance.

In this case, the support unit can calculate the similarity between the received utterance and another utterance by comparing the patter of the received utterance and the pattern of the other utterance.

The support unit can obtain similarities between a received utterance and utterances pertaining to various intents.

The intents are groups of a plurality of utterances and one intent may include a plurality of utterances. A plurality of utterances may be included in one intent by having a common characteristic.

For example, utterances "play a song", "play an album", "start a playlist", "play songs of singer A" have a common characteristic of playback of a song, whereby they can be included in one intent "play music".

Alternatively, utterances "play a song", "download a song", and "stop playing an album" have a common characteristic of control of playback of a song, whereby they can be included in one intent "control music".

Alternatively, utterances "check-in on 15", "check-out on 20", "check-in on 15 and check-out on 20", and "staying from 15 to 20" have a common characteristic of reservation at a hotel, whereby they can be included in one intent.

The support unit can obtain similarities between a received utterance and utterances pertaining to various intents.

For example, the support unit can obtain similarities between a received utterance and a plurality of utterance pertaining to a first intent and can obtain similarity between the received utterance and a plurality of utterances pertaining to a second intent.

The support unit can determine the intent of the received utterance on the basis of the obtained similarities. For example, the similarity between a received utterance and a plurality of utterances pertaining to the first intent is higher than the similarity between the received utterance and a plurality of utterance pertaining to the second intent, the support unit can determine that the intent of the received utterance is the first intent.

The support unit can determine the intent of a received utterance and obtain another utterance or response corresponding to the determined intent.

In detail, the support unit can obtain another utterance pertaining to the determined intent. For example, when an utterance "turn on a song" is received and the intent of the utterance "turn on a song" is "play music", the support unit can obtain another utterance "play a song" pertaining to "play music".

Further, the support unit can obtain a response pertaining to an answer corresponding to the determined intent.

For example, an answer corresponding to "play music" may be "play result". In this case, the support unit can obtain "played" pertaining to an answer "play result" or a response "song played" pertaining to an answer "play result".

The support unit can create a pattern of an utterance or a response to be recommended to a user (223).

The support unit can create an utterance or a response to be recommended to a user on the basis of the created pattern (223).

In detail, the support unit can obtain another utterance corresponding to the determined intent and having another pattern different from the pattern of the received utterance.

In detail, the support unit can provide another utterance having another pattern by performing at least one of adding, changing, and deleting on at least one of an entity name, an entity name word, a parameter, and a common word that are obtained from a received utterance.

For example, it assumed that a received utterance is as follows.

[<start: @play> <song: @music_song> please]

In this case, the intent of the received utterance is "play_music".

In this case, the support unit can obtain another utterance pertaining to "play_music".

The support unit can create another pattern different from the pattern of the received utterance.

In detail, an entity name "music_song" is included in [<start: @play> <song: @music_song> please].

In this case, the support unit can change the entity name "music_song" into another entity name "music_album". In this case, the support unit can create the following utterance.

[<start: @play> <album: @music_album> please]

In this case, the support unit may provide an utterance [<start: @play> <album: @music_album> please] including an entity name to a user or may provide an utterance [start an album please] including only an entity name word and a common word to a user without an entity name.

It is possible to not only change, but delete an entity name.

For example, an utterance [<start: @play> <song: @music_song> please] is received, the support unit can create an utterance [<album: @music_album>, please] by deleting the entity name "play" and changing the entity name "music_song" into another entity name.

Further, it is also possible to add an entity name or a common word.

For example, an utterance [<play: @play>], the support unit can add an entity name of "music_song" and adding a common word "please", thereby being able to create an utterance [<play: @play> <song: @music_song> please].

Further, it is also possible to add, change, or delete a parameter.

For example, an utterance [<15: @date, $startdate> check-in] is received, the support unit can determine that the intent of the received utterance is "hotel reservation" and create another utterance pertaining to the intent "hotel reservation".

In this case, the support can create another utterance [<15: @date, $enddate> check-out] by changing the parameter "startdate".

In this way, the support unit can provide another utterance having another pattern by performing at least one of adding, changing, and deleting on at least one of an entity name, an entity name word, a parameter, and a common word that are obtained from a received utterance.

Meanwhile, when the pattern of a received utterance is a new pattern, the support unit can create another utterance having a different pattern from the pattern of the received utterance by reflecting the new pattern.

In detail, utterances [<15: @date, $startdate> check-in], [<20: @data, $enddate> check-out], [from <15: @data, $startdate> to <20: @date, $enddate> have been included in the intent "hotel reservation".

Further, the support unit has received an utterance [<Aug.: @month> <15: @date, $startdate> check-in] from a user. In this case, the received utterance has new pattern including an entity name "month". The support unit can recognize a new patter in which an entity name "month" is added before the entity name "date".

In this case, the support unit can create an utterance [<Aug.: @month> <20: @date, $enddate> check-out], [staying from <Aug.: @month> <15: @data, $startdate> to <Aug.: @month> <20: @date, $enddate>] having a pattern different from the pattern of the received utterance by reflecting a new pattern including an entity name "month".

When the intent of the received utterance is determined and another utterance or response corresponding to the determined intent is obtained, the support unit can provide the utterance or response through the interface unit (225).

In detail, the support unit can display the obtained utterance or response through the output unit 112 or can transmit the obtained utterance or response to the device of the developer through the communication unit 113. In this case, the obtained utterance or response can be displayed on the device of the developer.

When a plurality of utterances or a plurality of responses is obtained, the support unit can provide a list of the utterances or a list of the responses.

When utterances or responses are provided, the user can check a list of the provided utterances or responses (212) and can register some or all of the provided utterances or responses (213). In this case, the support unit can keep the utterances or responses registered to be used.

The support unit can provide an utterance including a parameter related to a received utterance corresponding to the determined intent.

In detail, the support unit can obtain similarities between a received utterance and utterances pertaining to various intents and determine the intent of the received utterance on the basis of the similarities (231).

Further, the support unit can create a list of a plurality of parameters related to the received utterance (232).

For example, when a received utterance is "let me know weather", the support unit can create a list of parameters related to time such as "in 3 hours", "tomorrow", "the day after tomorrow", or "for one week" or a list of parameters related to places such as "Seoul", "northern part of Kyung-Ki", and "U.S.".

In this case, the support unit can create the pattern of an utterance or response to be recommended to the user using parameters related to the received utterance (233) and can create an utterance or response to be recommended to the user on the basis of the created pattern (234).

For example, the support unit can create an utterance using parameters related to time such as "let me know weather 3 hours later", "let me know tomorrow weather", "let me know weather of the day after tomorrow", and "let me know weather of one week" or an utterance using parameters related to places such as "let me know weather of Seoul", "let me know weather of the northern part of Kyung-Ki", and "let me know weather of U.S.".

The parameters related to time may be month, date, minute, hour, start time, end time, and repeated time.

The support unit can provide the created utterance through the interface unit (225).

Figure 3:
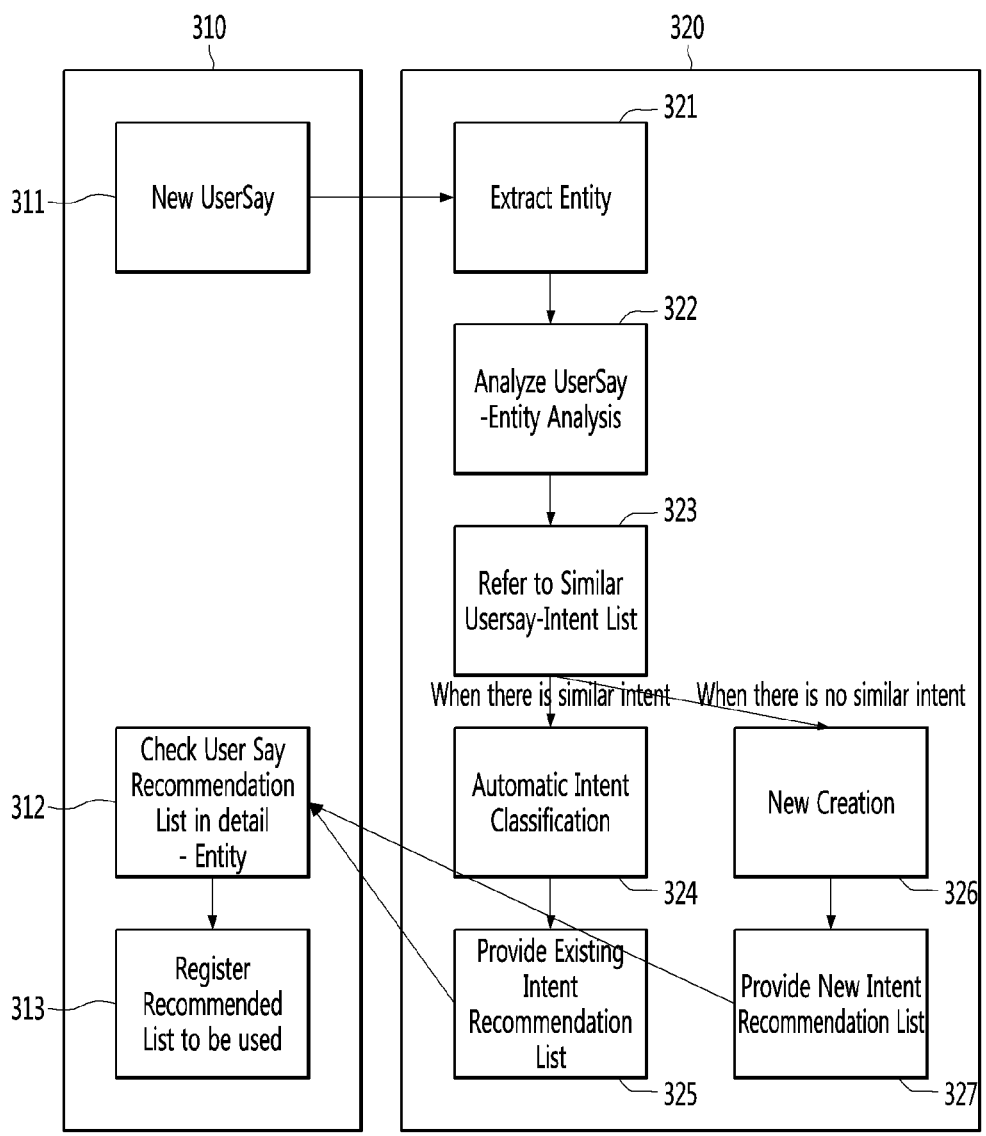
FIG. 3 is a diagram illustrating a method of classifying received utterances according to an embodiment of the present invention.

FIG. 3 is a diagram illustrating a method of classifying received utterances according to an embodiment of the present invention.

The support unit can classify and keep utterances registered by a user in a plurality of groups in accordance with intents.

For example, when utterances "turn on a song", "play an album", "check-in on 15 and check-out on 20", and "staying from 15 to 20" are registered by a user, the support unit can classify and keep the "turn on a song" and "play an album" pertaining to a first intent (play music) in a first group and can classify and keep "check-in on 15 and check-out on 20" and "staying from 15 to 20" pertaining to a second intent (hotel reservation) in a second group.

Operation of a user and operation of the toolkit providing system 100 are described with reference to a first block 310 and a second block 320, respectively.

A user can input an utterance or a response (311).

In this case, the support unit 120 can extract at least one of an entity name, an entity name word, a parameter, or a common word from the input utterance (321).

The support unit 120 can obtain similarities between the received utterance and utterances classified in a plurality of groups (322) and can obtain a group having a similarity higher than a predetermined value by comparing the similarities between the received utterances and the utterances classified in a plurality of groups (323).

Further, the support unit can add the received utterance to one of a plurality of groups or to a new group on the basis of the similarities.

For example, when an utterance "start a playlist" is received, the support unit 120 can obtain a first similarity between the received utterance and utterances classified in a first group and can obtain a second similarity between the received utterance and utterances classified in a second group.

When the first similarity is higher than the predetermined value and the second similarity is lower than the predetermined value, the support unit can determine the intent of the received utterance as a first intent corresponding to the first group (324). The support unit adds the received utterance to the first group, so the received utterance pertains to the first intent.

If the first similarity and the second similarity are both higher than the predetermined value, the support unit can provide a list including the first intent corresponding to the first group and the second intent corresponding to the second group through the interface unit (325).

In this case, the user can check the recommended list (312) and can register any one of a plurality of recommended intents. In this case, the received utterance can be classified and registered in the intent registered by the user and can be added to the group corresponding to the registered intent.

When the first similarity and the second similarity are both lower than the predetermined value, the support unit can create one or more new intents (326).

The support unit can provide a list including the one or more new intents through the interface (327).

In this case, the user can check the recommended list (312) and can register any one of a plurality of recommended intents. In this case, the received utterance can be classified and registered in the intent registered by the user and can be added to a new group corresponding to the registered intent.

Figure 4:
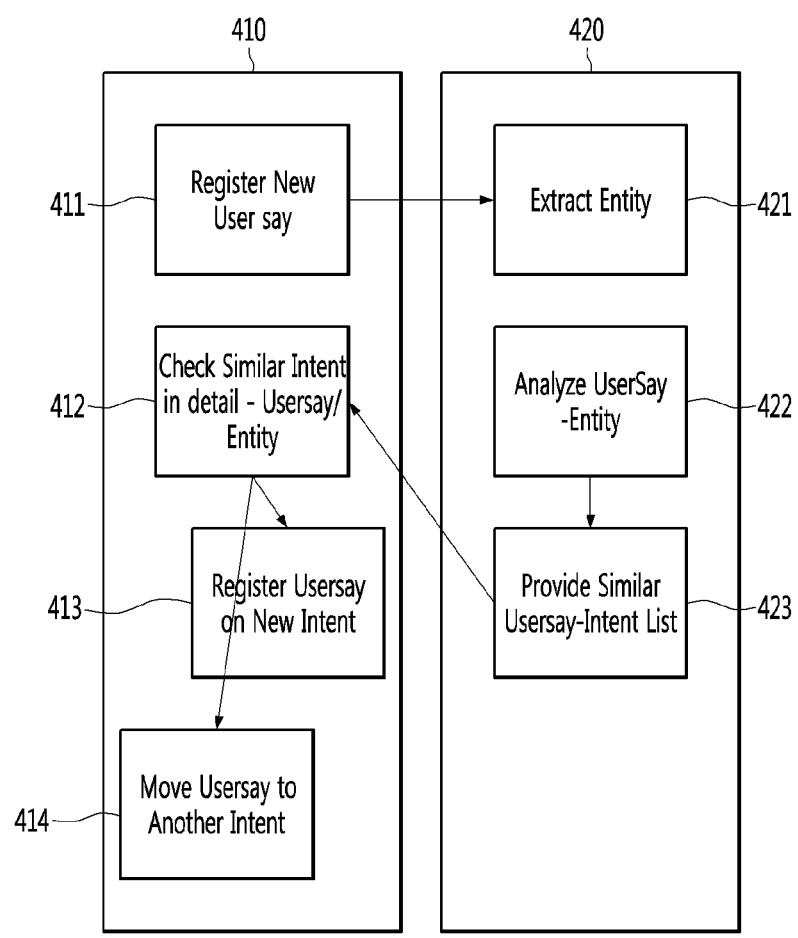
FIG. 4 is a diagram illustrating a method of moving an utterance to another intent or registering an utterance on a new intent in accordance with an embodiment of the present invention.

FIG. 4 is a diagram illustrating a method of moving an utterance to another intent or registering an utterance on a new intent in accordance with an embodiment of the present invention.

Operation of a user and operation of the toolkit providing system 100 are described with reference to a first block 410 and a second block 420, respectively.

A user can input an utterance or a response (411).

In this case, the support unit 120 can extract at least one of an entity name, an entity name word, a parameter, or a common word from the input utterance (421).

Further, the support unit can obtain similarities between a received utterances and utterances pertaining to various intents and determine the intent of the received utterance on the basis of the similarities (422).

In detail, the support unit can obtain the pattern of a received utterance using at least one of an entity name, an entity name word, a parameter, and a common word of the received utterance.

When the pattern of the received utterance is a registered pattern, the support unit can provide an alarm showing that the pattern is the registered pattern.

In detail, it is assumed that an utterance [turn on song A] has been registered in advance and a new utterance [turn on song B] has been received from a user.

Since the utterance [turn on song A] has been registered in advance, the pattern [turn on (@music_song)] has also been registered in advance. However, the pattern of the utterance [turn on song B] is the same as the pattern of the registered utterance [turn on song A], there is no need for additional input.

In this case, the support unit can provide an alarm showing that the utterance [turn on song B] is a registered pattern.

When a user inputs a plurality of utterances defined as one intent, the support unit can provide a list of one or more intents corresponding to the utterances (423).

In detail, the user can define and collectively input the utterances as one intent.

However, some of the utterances may have a low similarity with the other utterances and a high similarity with utterances pertaining to a specific intent. In this case, the support unit can provide a list of one or more intents having a high similarity with some utterances.

For example, it is assumed that a user collectively inputs utterances "turn on a song", "play a song", "start a playlist", and "download a song" as one intent. In this case, the utterance "download a song" may be low in similarity with the utterances "turn on a song", "play a song", and "start a playlist". Further, the utterance "download a song" may be high in similarity with utterances pertaining to an intent "music download". In this case, the support unit can provide a list including the intent "music download" that is high in similarity with the utterance "download a song".

In this case, the support unit can recommend deleting or moving some utterances.

Meanwhile, the user can define and collectively input the utterances as one intent.

However, the utterances can be classified in accordance with more detailed intents. In this case, the support unit can provide a list including a plurality of detailed intents.

For example, it is assumed that a user collectively inputs utterances "turn on a song", "play a song", "start a play list", "download a song", and "please, download a song" as one intent.

The utterances "turn on a song", "play a song", "start a play list", "download a song", and "please, download a song" can be classified into one intent, but may be classified into a plurality of intents.

For example, it is assumed that utterances "turn on a song", "play a song", "start a play list", "download a song", and "please, download a song" can be classified into one intent "music control".

However, "turn on a song", "play a song", and "start a play list" may be classified into a first detailed intent "music play", and "download a song" and "please, download a song" may be classified into a second intent "music download".

In this case, the support unit can provide a list including a plurality of detailed intents.

Further, the support unit can recommend a plurality of detailed intents.

When a list of intents is provided, the user can check the provided list (412).

Further, the user can register utterances on a new intent (413).

For example, when a plurality of detailed intents is recommended, the user can register "turn on a song", "play a song", and "start a playlist" on a first detailed intent "music play", and "download a song" and "please, download a song" on a second detailed intent "music download".

Further, the user can move utterances to another intent (414).

For example, when some utterances are lower in similarity with a plurality of utterances input together and are high in similarity with utterances pertaining to a specific intent, so the specific intent is recommended, the user can register the some utterances on the specific intent.

Further, the user may delete the some utterances without registering them on the specific intent.

The performance of intent analysis is influenced the most by contents input by an agent developer, so the agent developer has to make intents, utterances, and responses on the basis of a detailed and systematic reference by himself/herself, but unskilled agent developers have difficulty in making them on the basis of a detailed and systematic reference.

However, according to the present invention, artificial intelligence technologies are embedded in a toolkit and developers who use the toolkit uses these technologies through a GUI. Further, by using the toolkit, all developers can easily develop agents regardless of primary-grade/high-class agent developers and even non-NLP experts can easily develop their own voice dialogue agents without coding.

Figure 5:
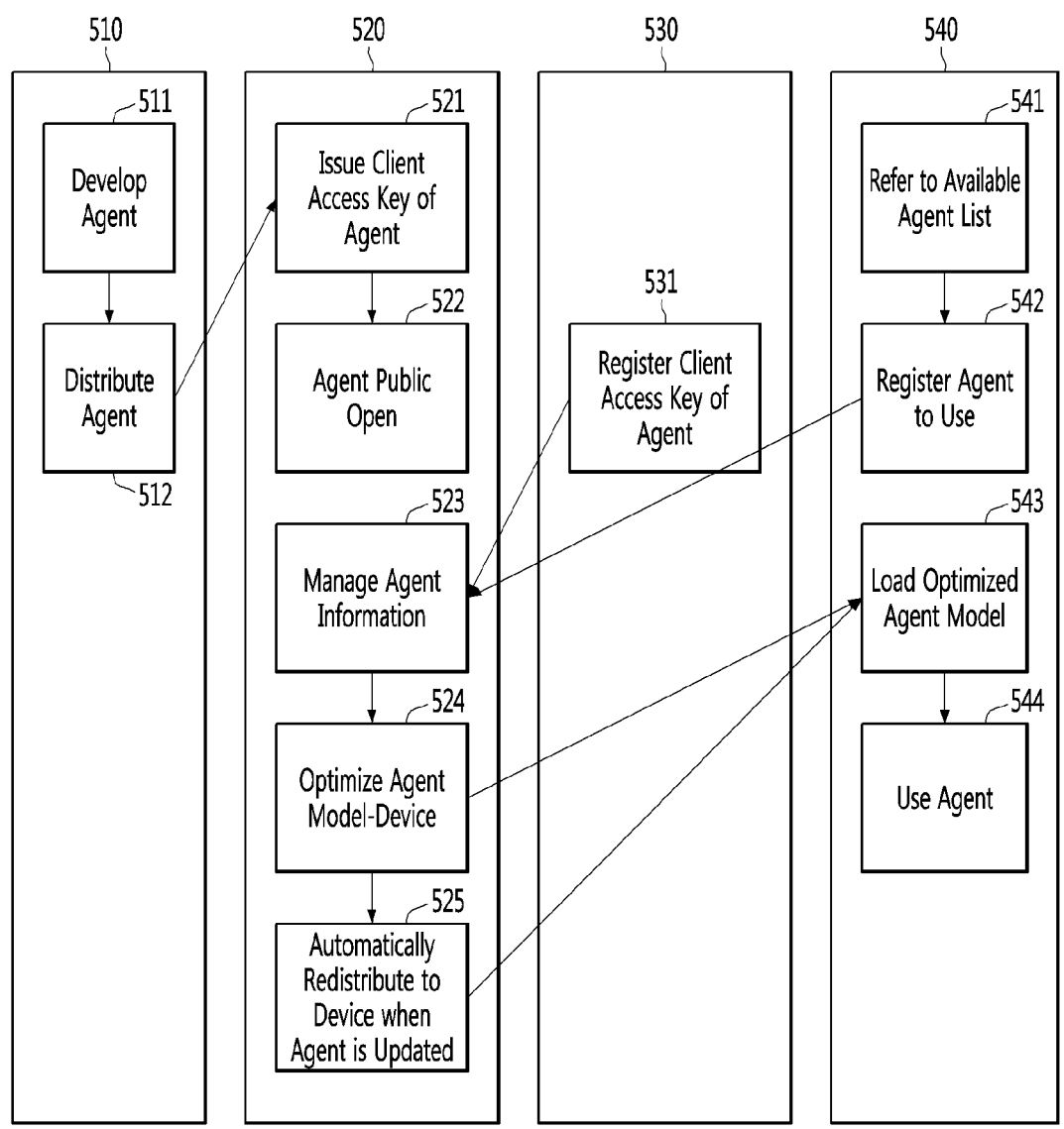
FIG. 5 is a diagram illustrating a process of distributing a completed agent.

FIG. 5 is a diagram illustrating a process of distributing a completed agent.

The operation of an agent developer, the operation of a system for providing a toolkit for an agent developer, the operation of an electronic device manufacturer, and the operation of an electronic device that provides a voice recognition service are described with reference to a first block 510, a second block 520, a third block 530, and a fourth block 540, respectively.

The operation of the second block 520 can be performed by not only the toolkit providing system, but a specific agent providing server.

When an agent using a toolkit is completed (511), the agent developer can transmit the completed agent to the toolkit providing system.

The completed agent can be kept in the toolkit providing system.

The toolkit providing system can issue an access key for a client to access the completed agent (521).

The toolkit providing system can publish the agent so that a client can access the agent (522).

The electronic device manufacturer can connect an electronic device and a voice agent using the access key (531).

In this case, the toolkit providing system can registers an electronic device that uses the access key (523).

The toolkit providing system can possess various agents developed by various agent developers.

The electronic device can refer to agent lists possessed and distributed to the public by the toolkit providing system (541).

Further, the electronic device can select and register an agent to be used by the electronic device.

In this case, the toolkit providing system can register information about the electronic device and the agent to be used by the electronic device (523).

The toolkit providing system optimize the agent such that the toolkit providing system provides a voice recognition service by the agent or can distribute the agent to the electronic device such that a voice recognition service is performed by the electronic device (524).

Further, when the agent is updated by additional development of the agent developer, the toolkit providing system can distribute the updated agent to the electronic device (525).

The electronic device can install the optimized or updated agent (543) and provide a voice recognition service using the agent (544).

Figure 6:
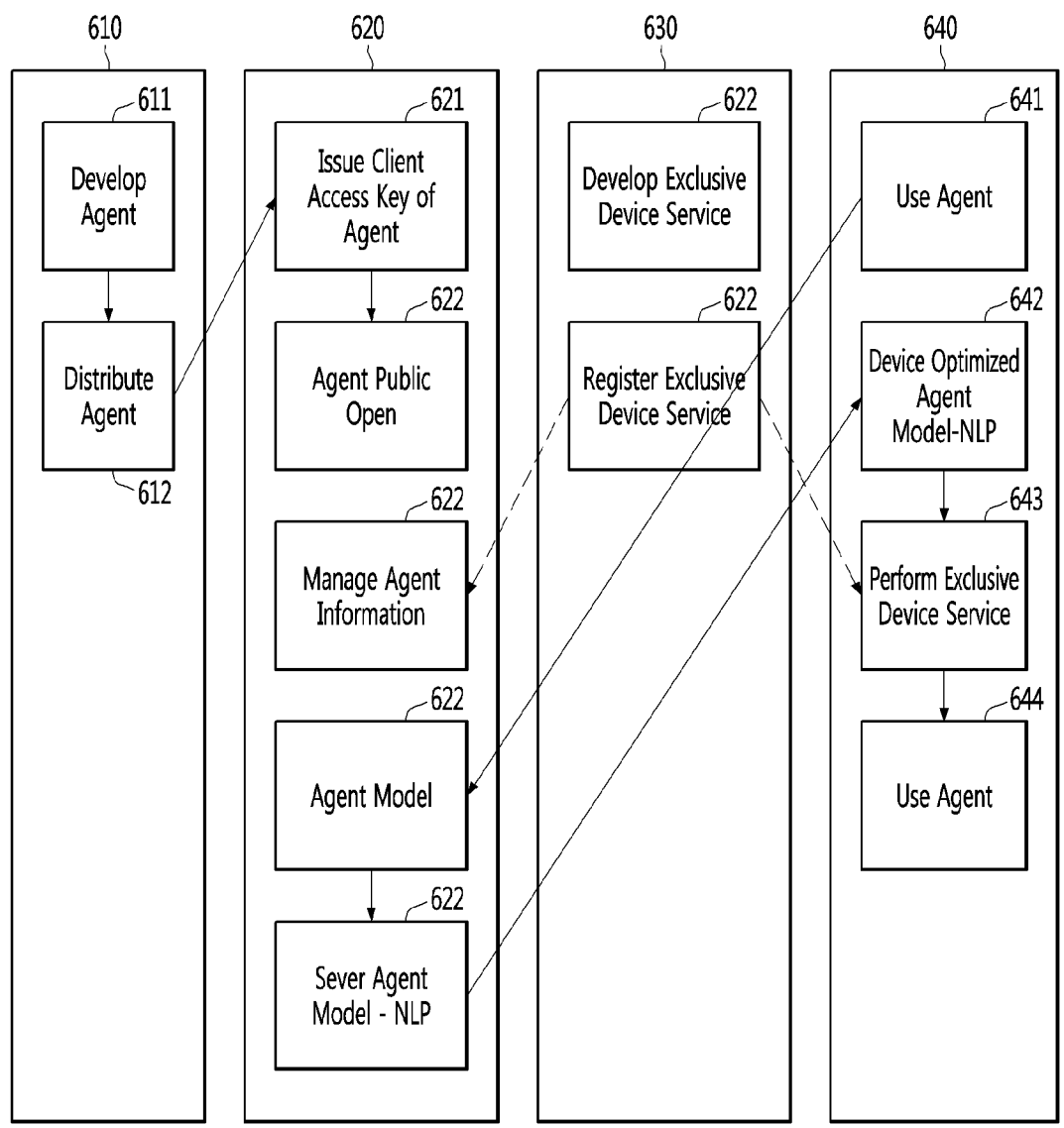
FIG. 6 is a diagram illustrating a hybrid sound recognition service using a toolkit providing device and an electronic device.

FIG. 6 is a diagram illustrating a hybrid sound recognition service using a toolkit providing device and an electronic device.

Only differences from FIG. 5 are described.

The electronic device manufacturer can develop an exclusive electronic device service (631) and register the exclusive electronic device service on the toolkit providing system and the electronic device (632).

In this case, the toolkit providing system can register the exclusive electronic device service (623).

The electronic device can provide a voice recognition service using an agent (641).

In this case, when an utterance is input by a user, the electronic device can transmit the received utterance to the toolkit providing system.

In this case, the toolkit providing system can input the received utterance to an agent that the toolkit providing system possesses (624).

The toolkit providing system can perform common work designated to the toolkit providing system and can transmit the result of the work to the electronic device (625).

The electronic device can perform post work designated to the electronic device (642) and can perform the exclusive electronic device service (643).

According to the present invention, the response speed of voice recognition is improved, network traffic is reduced, and the operational expenses for a server are decreased.

The present invention can be achieved by computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage.

The detailed description should not be construed as being limited in all respects and should be construed as an example. The scope of the present invention should be determined by reasonable analysis of the claims and all changes within an equivalent range of the present invention is included in the scope of the present invention.

What is claimed is:

1. A device for providing a toolkit for developing an agent, the device comprising:
   an interface unit configured to obtain an utterance input by a user, the interface unit comprising at least one of an input unit, an output unit, or a communication unit; and
   a support unit comprising at least one of a controller or a storage, and configured to:
   determine intent of the obtained utterance;
   determine at least one of another utterance or a response corresponding to the determined intent;
   cause the interface unit to output the determined at least one of another utterance or response; and
   in response to receiving a selection input from the user through the interface unit, register the determined at least one of another utterance or response corresponding to the selection input to the agent.

2. The device of claim 1, wherein the support unit is further configured to:
   obtain similarities between the obtained utterance and utterances pertaining to various intents; and
   determine the intent of the obtained utterance on the basis of the similarities.

3. The device of claim 1, wherein the support unit is further configured to determine the another utterance pertaining to the determined intent or the response pertaining to an answer corresponding to the determined intent.

4. The device of claim 1, wherein the support unit is further configured to obtain a pattern of the obtained utterance using at least one of an entity name, an entity name word, a parameter, or a common word obtained from the obtained utterance.

5. The device of claim 4, wherein the support unit is further configured to determine the another utterance corresponding to the determined intent and having a pattern different from the pattern of the obtained utterance.

6. The device of claim 5, wherein the support unit is further configured to determine the another utterance having the different pattern by performing at least one of adding, changing, or deleting at least one of the entity name, the entity name word, the parameter, or the common word.

7. The device of claim 4, wherein, when the pattern of the obtained utterance is a new pattern, the support unit is further configured to determine the another utterance having a pattern different from the pattern of the obtained utterance by reflecting the new pattern.

8. The device of claim 4, wherein when the pattern of the obtained utterance is a registered pattern, the support unit is further configured to cause the interface unit to output a notification indicating that the pattern of the obtained utterance is the registered pattern.

9. The device of claim 1, wherein, when a plurality of utterances defined as one intent by the user are input and intents of some of the plurality of utterances are different from an intent of other utterances, the support unit is further configured to cause the interface unit to output a recommendation of deleting or movement some of the utterances.

10. The device of claim 1, when a plurality of utterances defined as one intent by the user are input and the plurality of utterances are classified in accordance with a plurality of detailed intents, the support unit is further configured to cause the interface unit to output a recommendation of the plurality of detailed intents.

11. The device of claim 1, wherein the support unit is further configured to:

classify utterances registered by the user in a plurality of
   groups in accordance with intents;
store the classified utterances;
compare similarities between the obtained utterance and
   the utterances classified into a plurality of groups; and
add the obtained utterance to one of the plurality of groups
   or a new group on the basis of the similarities.

* * * * *